B. R. LA SELLE.
HAT SIZING, BLOCKING, AND DRYING MACHINE.
APPLICATION FILED APR. 28, 1919.

B. R. LA SELLE.
HAT SIZING, BLOCKING, AND DRYING MACHINE.
APPLICATION FILED APR. 28, 1919.

1,356,992.

Patented Oct. 26, 1920.

Witnesses
J. W. Angell
Charles W. Hill Jr.

Inventor
Burton R. LaSelle
by Charles W. Neill
Atty.

UNITED STATES PATENT OFFICE.

BURTON R. LA SELLE, OF CHICAGO, ILLINOIS.

HAT SIZING, BLOCKING, AND DRYING MACHINE.

1,356,992.   Specification of Letters Patent.   Patented Oct. 26, 1920.

Application filed April 28, 1919.  Serial No. 293,199.

*To all whom it may concern:*

Be it known that I, BURTON R. LA SELLE, a citizen of the United States, and a resident of the city of Chicago, in the county of Cook and State of Illinois, have invented certain new and useful Improvements in Hat Sizing, Blocking, and Drying Machines; and I do hereby declare that the following is a full, clear, and exact description of the same, reference being had to the accompanying drawings, and to the numerals of reference marked thereon, which form a part of this specification.

This invention relates to hat sizing, blocking and drying machines and, although not limited to such use, is particularly adapted for the sizing, blocking and drying of straw hats.

Heretofore, straw hats, as they come from the sewing room, have been sized in various manners; sometimes by dipping them into the sizing solution and laying them on drain boards to drain, turning them at intervals, that they may drain evenly, and by putting the hat onto a block of the proper shape and applying the sizing solution with a sponge, sponging off the surplus sizing. After the hat is dried, which, heretofore, has taken from five to twenty-four hours, according to the method employed, then the hat is ready for blocking. After the blocking operation the hat must set for another twelve hours. Then the hat is ready for steaming, which requires another drying operation of about twelve hours.

One of the principal objects of the invention is to reduce the time of these operations so that the hat can be sized, blocked and pressed in one working day.

It is also an object of the invention to enable the hats to be blocked while still wet with sizing.

A further object of the invention is to enable the hats to be blocked better and more smoothly so that the steaming process is avoided.

An additional object of the invention is to provide means whereby one man may accomplish in a single operation in two hours what has hitherto required three separate operations and three separate sets of men over a period of three or four days.

A further object of the invention is to provide improved means for removing the excess size or glue from the hats.

Another object of the invention is to provide improved means for drying the hats, after the excess size or glue has been removed.

It is also an object of the invention to provide a machine by which the excess size or glue may be removed and the hats blocked and dried in one continuous operation.

This invention also has other important objects which will be apparent from the disclosures in the specification and drawings.

The invention (in a preferred form) is illustrated in the drawings and hereinafter more fully described.

The device consists of a series of rotatable pans 1, in each of which is arranged a rotatable hat block 106. In the construction illustrated eight pans are provided symmetrically arranged in a circle around a turret 2, which is in turn rotatably mounted on a base 3.

Figure 1:
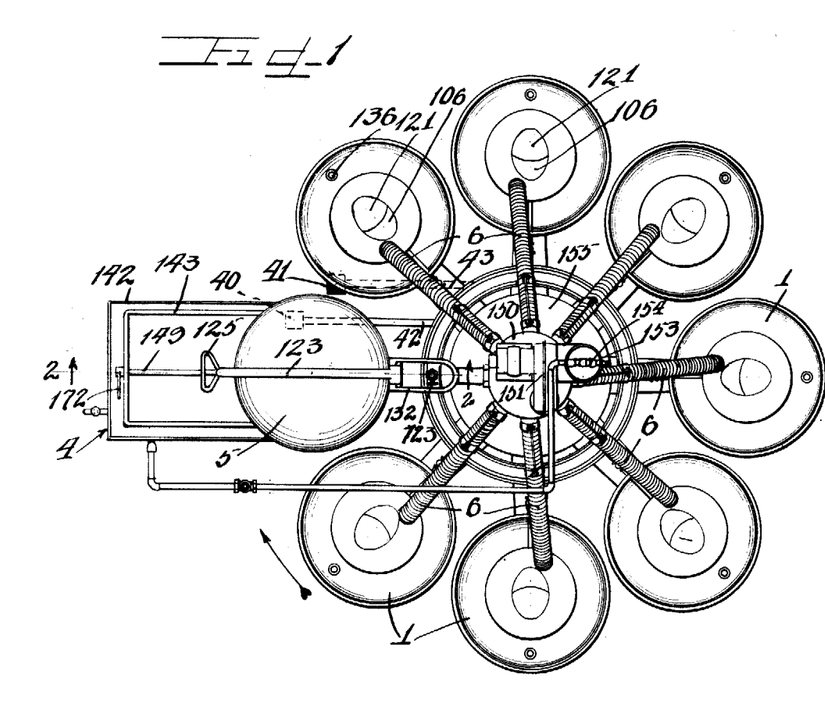
Figure 1 is a plan view of a machine embodying the present invention.

A hat is placed on the block 106, which at that time is above the glue pan 4. Glue or sizing solution is then applied from the glue pan 4. Usually the thin glue is first applied to the whole hat and then thicker glue is applied to the hat brim. A hinged cover 5, is then brought over the pan for the purpose of catching the glue which is thrown off from the hat by centrifugal force. After the hat has been rotated a sufficient length of time, usually about 18 seconds, the cover 5 is lifted and the hat blocked by hand. Then the turret 2, is rotated in the direction of the arrow shown in Fig. 1 to allow the next pan to come into position over the glue pan. The hat freshly coated with glue then comes under the discharge orifice of an air pipe 6 for drying the glue remaining thereon after spinning the hat under the cover 5. Since the object, after the hat has been moved away from the glue pan, is to dry the glue and not remove any substantial further amount of glue, the hats while under the air pipes are rotated at a lower speed than the hat which is temporarily over the glue pan. Usually the air delivered from the pipes 6 is heated, but in some cases, particularly when white straw hats are being operated on, cold air is used as hot air will discolor the hats.

Figure 15:
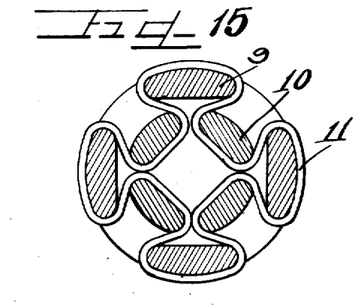
Fig. 15 is a section on the line 15—15 of Fig. 5.

The machine receives power from a driving shaft 7 (Fig. 5) connected to the shaft 8, journaled in the base 3, by a flexible coupling. This flexible coupling, as shown more particularly in Fig. 15, comprises an outer series of circularly and symmetrically arranged bars 9, connected to the shaft 8, and an inner series of bars 10, connected to the shaft 7. Between these bars is wound a band 11, of flexible and preferably resilient material.

On the shaft 8, is arranged a worm 12, in mesh with a worm wheel 13, on a vertical shaft 14, journaled in a sleeve 15, forming a part of the base 3. To the upper end of this shaft is secured a pinion 16, adapted to mesh with a gear 17, on a sleeve 18, rotatably mounted on the upper part of the base 3. Integrally connected with this sleeve 18, is a bevel gear 19, adapted to mesh with bevel gears 20 on the shafts 21, by which the hat blocks 106 in the pans 1, are rotated.

Figure 7:
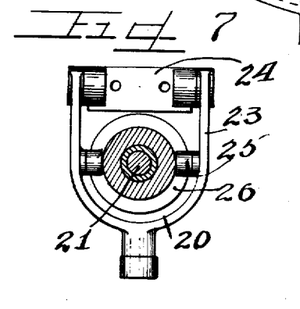
Fig. 7 is a section on the line 7—7 of Fig. 6.
Figure 8:
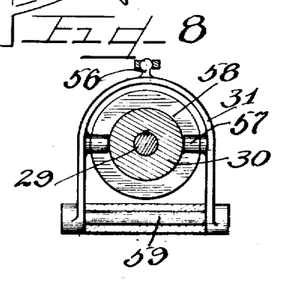
Fig. 8 is a section on the line 8—8 of Fig. 6.
Figure 9:
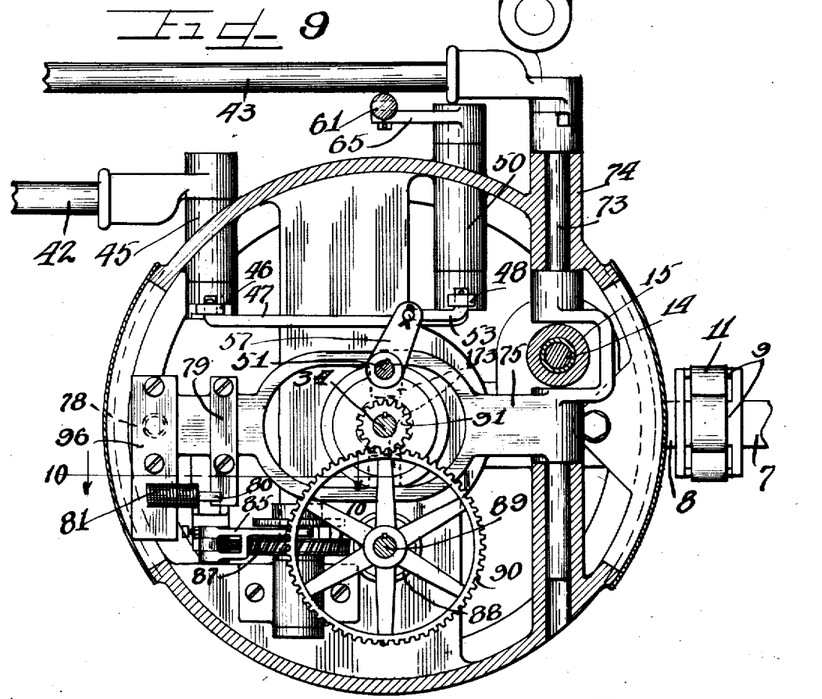
Fig. 9 is a section on the line 9—9 of Fig. 5.
Figure 10:
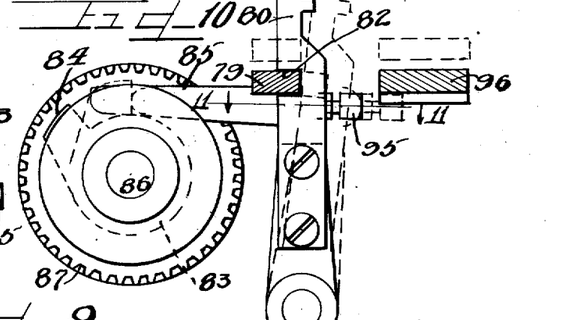
Fig. 10 is a side elevation of a part of the timing mechanism.

The bevel gears 20, are slidably and rotatably mounted on the shafts 21, and are normally held in rotatable engagement with the shafts 21 by means of friction clutches 22. Each gear 20, is provided with a conical inner face adapted to engage frictionally with the outer face of the clutch 22. A yoke 23, is provided for sliding each gear 20, along its shaft 21, to bring the gear in and out of engagement with the clutch 22. Each yoke, as shown in Fig. 7, is pivoted at its upper end to a bracket 24, secured to the inner wall of the turret 2. Pins carrying rollers 25, adapted to engage the sides of a groove 26, in the hub of each gear 20, are arranged on the inner faces of the yoke. A spring 27, bears against the lower end of the yoke to press the latter and thereby the gear 20, inward to produce frictional engagement between the gear 20 and the clutch 22.

As each pan 1 moves into position over the glue pan the lower end of the corresponding yoke 23 is engaged by a cam 28, secured to the upper part of the base 3, and is thereby pushed outwardly to disengage its gear 20, not only from the clutch 22, but also from the gear 19.

The shaft 21, on which this particular gear 20 is mounted is then free to be driven at a higher rate of speed than the other shafts 21.

The high speed drive is obtained by means of a shaft 29, which is in alinement with each shaft 21, when its corresponding pan is over the glue pan. On one end of this shaft is slidably but non-rotatably mounted a second clutch 30. This clutch is adapted to engage the inner face of the first clutch 22, when moved forward by its yoke 31. On the other end of this shaft a bevel pinion 32 is arranged in mesh with a bevel pinion 33, on a shaft 34, vertically and axially journaled in the base 3.

On the lower end of this shaft 34, a third clutch 35 is slidably but non-rotatably mounted and adapted to engage a corresponding clutch member 36, secured to the end of a vertical shaft 37. This latter shaft is driven from the main shaft 8, by means of bevel gears 38 and 39.

It will be seen that when the clutches 30 and 35 are in engagement the corresponding shaft 21 will be driven at substantially the same speed as the main shaft 8. The other shafts 21 will, however, rotate much more slowly in view of the worm 12, and worm wheel 13, reduction gearing. The gears 20 are driven at somewhat higher speed than the gear 19, but this speed increase is more than compensated for by the reduction in speed due to the difference in sizes of the pinion 16 and gear 17.

Figure 12:
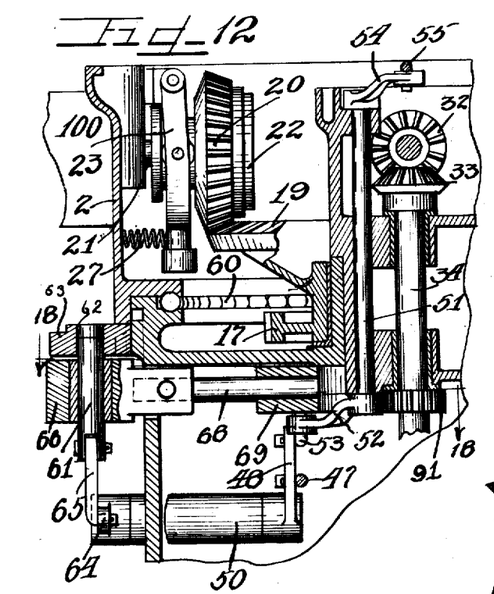
Fig. 12 is a detail sectional view of certain parts of the machine.
Figure 13:
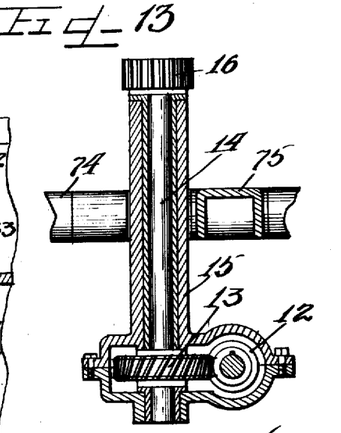
Fig. 13 is a section on the line 13—13 of Fig. 5.

The second and third clutches, 30 and 35 respectively, are controlled by a pair of foot pedals 40, 41 on the ends of arms 42, 43. Springs (not shown) are arranged under each pedal to hold them in elevated position. The arm 42 is secured to the outer end of a stub shaft 44, journaled in a boss 45, on the base 3. On the other end of this shaft is rigidly mounted an arm 46, connected by a link 47 to a similar arm 48. The latter arm is mounted on the end of a stub shaft 49, journaled in the boss 50, on the base 3. This arm 48 is arranged to rotate to and fro a vertical shaft 51 (Fig. 12) by means of an arm 52, secured to the lower end of the shaft 51, and connected to the arm 48, by means of a link 53. At the upper end of this shaft 51, is mounted an arm 54, connected by a link 55, to the upper end of the yoke 31, which operates the clutch 30. A ball and socket connection is provided between the link 55 and a knob 56, at the top of the yoke 31. This yoke is provided with inwardly extending rollers 57, for engagement with the groove 58, in the clutch 30. The yoke is pivotally connected to the upper part of the base by a pin 59.
In view of the mechanism just described depression of the pedal 40 retracts the clutch 30 so as to clear the clutch 22, and so allow the turret 2 to rotate sufficiently to bring the next gear 20 and clutch 22 into alinement therewith. This rotation of the turret 2 may be brought about by hand or else the turret may be allowed to rotate itself. Since the turret is mounted on the base 3, by ball bearings 60, it is easier for the gear 19 to turn the turret 2, with the gears 20 stationary than it is to rotate the latter with the turret 2 stationary. Normally, rotation of the turret 2 is prevented by the engagement of a pin 61 (Fig. 12) with one or other of the apertures 62, in a flange 63, on the lower part of the turret. When it is desired to allow the turret 2 to rotate to bring the next hat pan over the glue pan this pin is withdrawn by depressing the pedal 40, which operates the clutch 30. For this purpose an arm 64 is mounted on the end of the shaft 49, which is adapted, as above described, to be turned by the depression of the pedal 40. This arm 64 is connected by a link 65 to the pin 61. In this manner depression of the pedal simultaneously retracts the pin 61 and the clutch 30, which are the only impediments to the rotation of the turret 2.
As it is very important that the clutch 30 should be in exact alinement with the clutch 22, and to enable the turret 2 to adjust its position to allow of this alinement the support 66, for the pin 61, is laterally yieldingly connected to the base 3, as shown more particularly in Fig. 18.

The base 3 is formed with a lateral aperture 67, through which extends an arm 68, to which is attached at one end the support 66, and at the other end the fork 69. The fork is connected by bolts 70, to a part 71 of the base. Slots 174, are provided in the fork to allow the desired play between the bolts 70 and the fork 69. The arm 68 is normally held in central position in the aperture 67 by means of springs 72, arranged to engage opposite sides thereof.

The clutch 35 is brought into operative position by the foot pedal 41. The arm 43, which carries this pedal is secured to the outer end of a stub shaft 73, journaled in a boss 74, on the base 3. To the inner end of this shaft is connected an arm 75, having a central aperture therein for the reception of the clutch 35. Pins 173, are arranged on the side walls of this aperture for engagement with the groove 77, of the clutch 35.

The weight of the arms 43 and 75 tends to hold the clutch 35 in engaged position and consequently a spring 78 is provided for normally holding the clutch in disengaged position. This spring (Fig. 5) bears against the underside of the end of the arm 75.

I have found that the hats should not be spun too long at high speed as that would result in the removal of too much glue. Similarly if spun for too short a time the glue left is too thick and irregularly distributed. A timing mechanism is, therefore, provided for releasing the clutch 35 a given number of revolutions after it has been brought into engagement.

Near the end of the arm 75, a cross-bar 79 is provided. Against the edge of this bar an arm 80 is pressed by means of a spring 81. In the edge of this arm a notch 82 is formed adapted to register with and receive the edge of the cross bar 79, when the arm 75 has been depressed to bring the clutch 35 into engaging position. The arm 80, then holds the arm 75 depressed until the arm 80 is moved out of engagement with the cross-bar 79, by the timing device. This timing device comprises a cam 83, having a radial extension 84 thereon adapted to engage the end of an arm 85, carried by the arm 80, to push the latter rearwardly. This cam is mounted on a shaft 86, to which is rigidly secured a worm wheel 87, in mesh with a worm 88. This worm 88, is mounted on the lower end of a vertical shaft 89, to the upper end of which is attached a gear 90. This gear 90 is driven by a pinion 91, on the shaft 34, which carries the clutch 35. Hence after the clutch 35, has been brought into engagement and the arm 75 locked in depressed position the clutch remains in engagement until the cam has been rotated by the chain of gearing just described sufficiently to bring the extension 84 into contact with the end of the arm 85, and to push the latter rearwardly to release the cross-bar 79, from the notch 82, in the arm 80. As soon as this occurs the arm 75 springs upward under the action of the spring 78, thereby releasing the clutch 35. Since the cam 83 is rotated by the shaft connected to the clutch 35, as soon as the latter is released the rotation of the cam 83 ceases.

Figure 11:
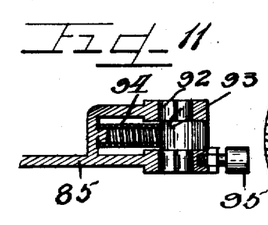
Fig. 11 is a section on the line 11—11 of Fig. 10.

Since the timing mechanism stops with the arm 85 in engagement with the extension 84, of the cam 83, means must be provided for lifting the arm 85 out of the path of this extension to allow of another rotation of the cam. For this purpose the arm 85 has a short longitudinal range of movement relatively to the arm 80. This is attained by forming elongated slots 92, in the arm 85, along which pins 93, connected to the arm 80, may slide. Normally the arm 85 is held in extended position by means of a spring 94 (Fig. 11). Under the pressure of the extension 84, however, this spring is compressed thereby moving the arm 85 rearwardly with respect to the arm 80. At the end of the arm 85, a bolt 95 is provided adapted to extend under a second cross-bar 96, attached to the arm 75, when the extension 84 has moved the arm 85 rearwardly. When the arm 75 is depressed by the pedal 41, to bring the clutch 35 into operation once more the bar 96 engages and depresses the head of the bolt 95, thereby raising the opposite end of the arm 85 out of engagement with the extension 84. Immediately the end of the arm 85, is free of the extension 84, the spring 94 moves the arm 85 forwardly and thereby moves the head of the bolt 95 out of engagement with the crossbar. The other end of the arm 85 then rests on the extension 84, and drops behind it as the cam rotates ready for a second engagement with the extension 84.

Figure 6:
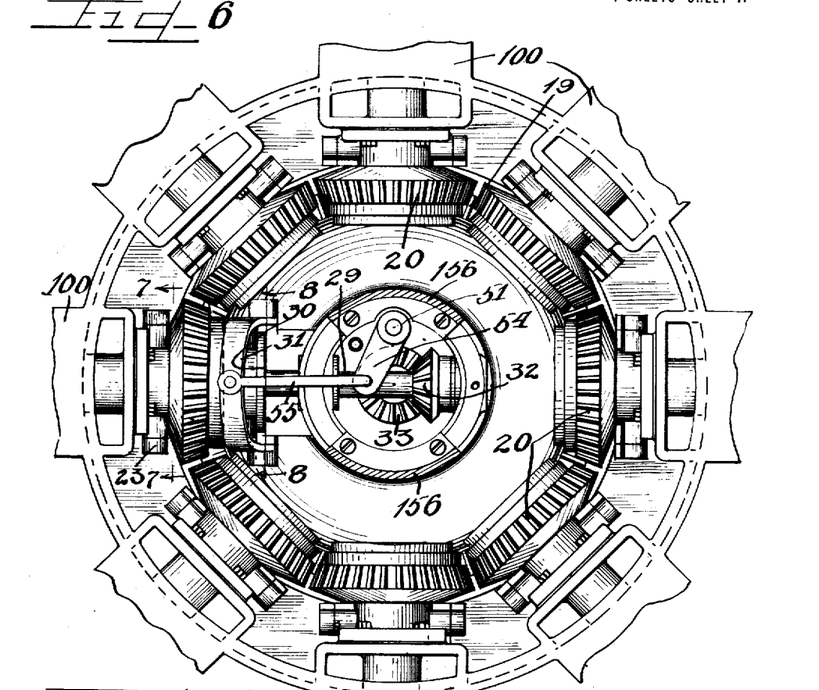
Fig. 6 is a section on the line 6—6 of Fig. 5.

The turret is covered by a lid 155, supported by extensions 156 (Fig. 6) of the base 2.

Immediately below this lid is an oil pipe 157, with perforations at each end adapted to discharge into oil cups 158, above the bearings of the shafts 21. Other perforations along the pipe 157, discharge oil over the gearing within the turret 2 and the base 3. A second oil pipe 159, supplies oil to the worm 12 and worm-wheel 13, in the lower part of the base.

Figure 14:
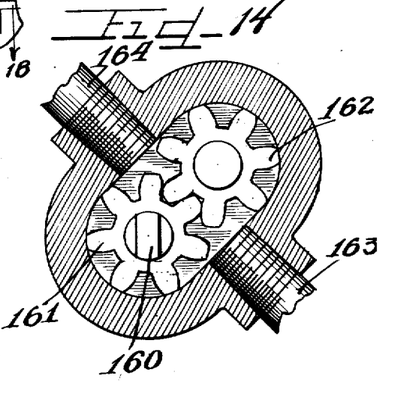
Fig. 14 is a section on the line 14—14 of Fig. 5.

Both these oil pipes 157 and 159 are supplied with oil by a rotary pump of the intermeshing gear type shown in Fig. 14. The shaft 160, of this pump is directly connected to the shaft 37, immediately above it and is driven therefrom. The intermeshing gears 161 and 162 draw oil through a pipe 163, from an oil pan 165, and force it through a pipe 164, connected to the oil distributing pipes 157 and 159.

The base 3 is provided with an inwardly extending flange 166, immediately above the oil pan 165, to insure that all the oil will drain back into the latter.

The mechanism for rotating the hat blocks 106, and the turret 2 therefor having been described the construction of the pans 1, hat blocks 106 and the parts cooperating therewith will now be set forth.

Figures 2, 3, 4:
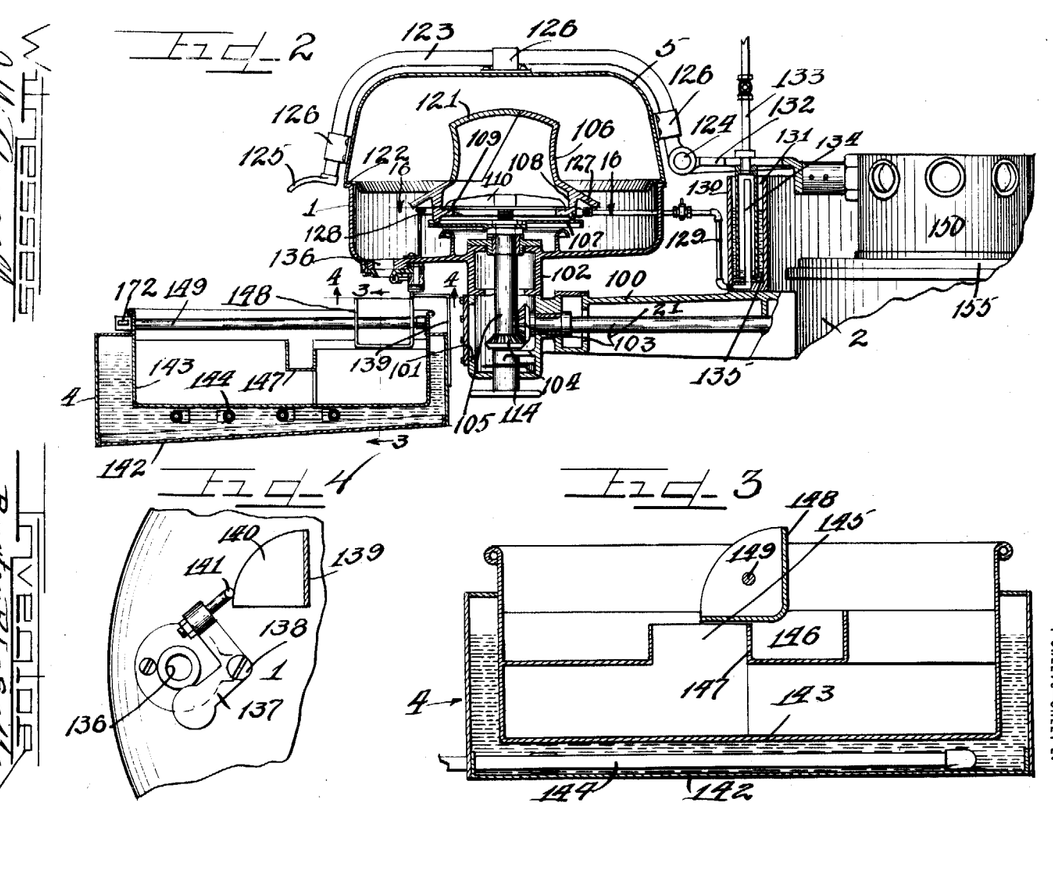
Fig. 2 is a section on the line 2—2 of Fig. 1.
Fig. 3 is a section on the line 3—3 of Fig. 2.
Fig. 4 is a section on the line 4—4 of Fig. 2.

Referring to Fig. 2 of the drawings, it will be seen that the turret is provided with a series of channeled extensions 100, each ending in a cylindrical part 101, on top of which is mounted a boss 102, on the bottom of the pan 1.

Figures 16, 17, 18, 19:
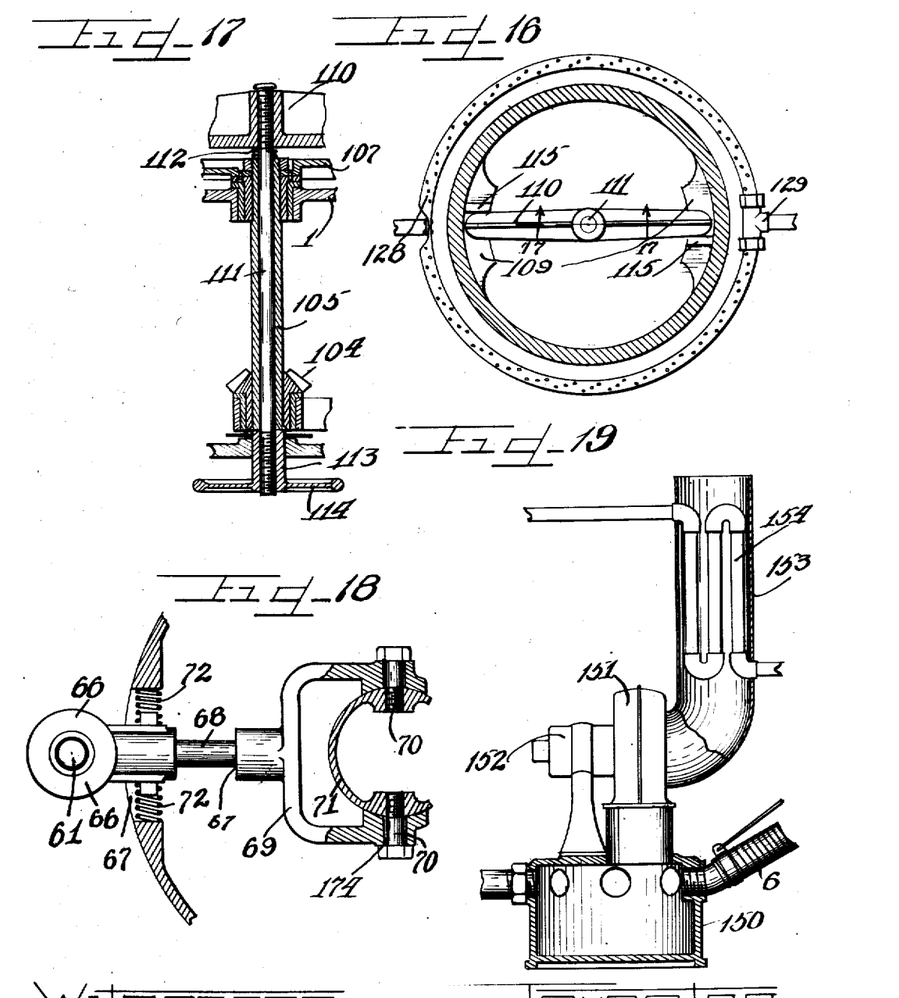
Fig. 16 is a section on the line 16—16 of Fig. 2.
Fig. 17 is a section on the line 17—17 of Fig. 16.
Fig. 18 is a section on the line 18—18 of Fig. 12.
Fig. 19 is a side elevation partly in section of the air-heating apparatus.

The shaft 21 extends through the channeled extension 100, and carries at its end a bevel pinion 103. This pinion meshes with a second pinion 104, on a vertical hollow shaft or sleeve 105, journaled at one end in the part 101, and at the other end in the lower part of the pan 1. Rigidly secured to the top of the sleeve 105, is a table 107, on which the hat block 106 is adapted to rest. The block 106 is formed with an outwardly extending flange 127, and a downwardly projecting flange 108. This latter flange is provided with inwardly projecting portions 109, for engagement with a clamping bar 110. This clamping bar is secured on the end of a rod 111, slidably mounted in the sleeve 105. A spring 112 is arranged between the table 107 and the clamping bar 110, so as to hold the latter in elevated position. An adjusting nut 113, provided with a hand-wheel 114, is provided on the other end of the rod 111, for drawing the clamping bar down against the portions 109, of the block. As shown in Fig. 16, the two inwardly projecting portions 109, of the block do not extend wholly around the block so that the ends of the clamping bar may be passed between these projecting portions. After the block is seated on the table 107, it is given a half turn in an anti-clockwise direction to bring the ends of the clamping bar over the projecting portions 109, and against the stops 115 on the latter. The hand-wheel is then turned to draw the clamping bar into gripping contact with the portions 109. As the table is rotated in an anti-clockwise direction the stops 115 prevent accidental disengagement of the clamping bar and the block during the rotation of the latter.

The block 106, on which the hat is mounted, is preferably formed with a detachable portion 121, to facilitate the insertion of the hat on and the removal of the hat from the block not only when the crown of the hat curves outwardly in its upper portion as indicated in Fig. 2, but also for hats with other shapes of crowns. As the hats are dried on the block the hats tend to stick to the latter, but the glue connection may be conveniently broken by giving the hat a blow opposite the part 121, to lift the latter and with it the hat away from the other parts of the block.

The cover 5, is of sufficient height so that it will clear the top of the highest hat to be sized when the inturned flange 122, at its lower end is resting on the upper edge of the pan 1. The inner edge of this flange is preferably downwardly turned to facilitate the dripping of the glue from the inner surface of the cover into the pan 1.

Suitable means may be provided for hingedly connecting the cover to the base of the machine, such as a curved tubular bracket 123, hinged at 124, and provided with a handle 125, at its outer end. This bracket is connected to the top and sides of the cover at 126.

Under the flange 127, of the block 106, a ring burner 128 is arranged supplied with gas through a pipe 129, passing through the wall of the pan 1. As these pipes 129 rotate with the turret special means are necessary for connecting them to the source of supply. In the form of construction shown two annular channeled rings 130 and 131 are provided. The outer and larger ring 130, is secured to the turret and is open upwardly, while the smaller ring 131, is inverted and extends downwardly within the outer ring 130. The ring 131 is supported by an arm 132, rigidly connected to the base 3 of the machine. A gas pipe 133, from any convenient source of supply is connected to the upper part of the ring 131, to supply gas to the interior thereof. The pipe 129 is provided with an extension 134, extending upwardly into the ring 131, to receive gas therefrom. The passage of gas around the lower margins of the ring 131, is prevented by means of a water-seal 135.

The glue or sizing solution thrown off from the hat by centrifugal force runs down into the bottom of the pan 1, from which it may be discharged through an aperture 136. This aperture is normally closed by one end of a plate 137 (Fig. 4) pivoted to the bottom of the pan at 138. Secured to the side of the glue pan is a plate 139, having at its upper end an outwardly extending flange 140, the edge of which flange acts as a cam to engage a bent rod 141, secured to the plate 137, to move the latter into open position. A spring (not shown) is provided for returning the plate 137 to closed position after it has been moved out of contact with the cam 140.

The glue passing through the discharge orifice 136, runs into the glue pan 4. This pan comprises an outer container 142, and an inner container 143, the space between them being partially filled with water preferably heated by means of steam pipes 144. The inner container is divided into two compartments 145 and 146, by a partition 147. One of these compartments, as 145, is for the thin glue which is applied first to the whole hat and the excess of which runs off by gravity before high speed rotation is commenced, while the other compartment is for the heavier glue which is applied to the brim the excess of which is thrown off by high speed rotation of the hat under the cover 5.

In order that the glue may be discharged into the two compartments alternatively, a deflector 148 is provided pivotally mounted on a rod 149. In the position shown in Figs. 2 and 3, the deflector is arranged to direct the thin glue the excess of which runs off by gravity into the compartment 145. By turning the deflector through 90° by means of the handle 172, on the end of the rod 149, the heavier glue thrown off centrifugally will be directed into the other compartment 146.

After the hat has been spun at high speed under the cover 5, the turret is rotated through 45°, which brings the hat under one of the hot air pipes 6. These pipes are all connected to a central chamber 150. Mounted on the top of this chamber 150, is a fan 151, driven by an electric motor 152. This fan receives air through an upturned pipe 153, in which steam pipes 154 are arranged for heating the air.

Figure 5:
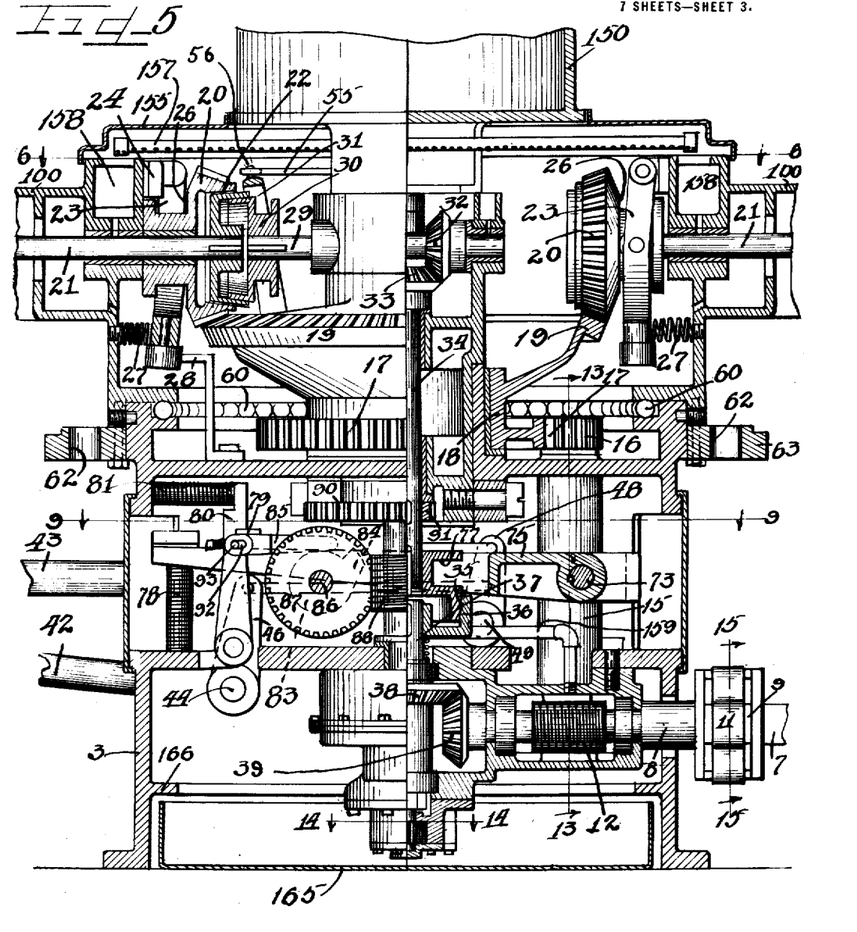
Fig. 5 is a vertical section through the central portion of the machine with parts in elevation.

The operation is as follows:

With the cover 5 in elevated position a hat is placed on the block 106, which at that time is over the glue pan 4. Thin glue or sizing solution is then applied to the hat from the pan 4. The excess thin glue runs off by gravity through the aperture 136 into the compartment 145 of the glue pan. In this position the block is stationary owing to the fact that the cam 28 has through the yoke 23 drawn the gear 20 out of engagement with the gear 19 and the clutch 22. Before rotating the block the deflector 148 is turned by its handle 172 to direct glue from the pan 1 into the compartment 146, and thick glue is applied to the hat brim. The cover 5 is then lowered and the block placed in rotation. The foot pedal 40 is normally held in elevated position by a spring (not shown) so that the clutch members 30 and 22 are normally in engagement as shown in Fig. 5. The corresponding block 106 is not rotated, however, until the clutch members 35 and 36 have been brought into engagement by depressing the arm 75 against the action of the spring 78 by pressure of the foot on the pedal 41. As soon as the lever 75 has been depressed sufficiently to engage the clutch members 35 and 36, the arm 80 is moved laterally by its spring 81 to bring the cross piece 79 on the arm 75 into engagement with the notch 82 in the side of the arm 80. The arm 75 is thus held in depressed position with the clutch members 35 and 36 in frictional contact.

The hat block now rotates at high speed and the excess thick glue is thrown off from the hat and collects in the pan 1, from which it is discharged through the aperture 136 into the compartment 146.

The shaft 34 connected to the clutch 35 rotates the cam 83 through reduction gearing comprising the pinion 91, gear 90, worm 88 and worm wheel 87. This rotation of the cam brings the extension 84 thereon into engagement with the arm 85 carried by the arm 80. The first result of this engagement is to move the arm 85 rearwardly with respect to the arm 80, thereby compressing the spring 94, since the latter spring is weaker than the spring 81 acting in the opposite direction. As soon as the ends of the slots 92 in the arm 85 contact with the pins 93 connected to the arm 80, further movement of the arm 85 moves the arm 80 away from the cross piece 79 of the arm 75. When the cross piece 79 is clear of the notch 82 the arm 75 is free to move upward under the action of its spring 78, thereby disengaging the clutch members 35 and 36 and stopping the rotation of the hat block and also of the cam 83.

The next operation is to block the hat. The turret is then moved around one step to bring the hat under the first of the hot air pipes 6. For this purpose the cover 5 is lifted to clear the edges of the pan 1. The hat is then blocked by hand. Next the deflector 148 is turned by its handle 172 so that it will direct glue from the next pan 1 into the compartment 145 when the pin 141 on the plate 137, which normally closes the aperture 136, is acted on by the cam 140 as the pan moves into position over the glue pan.

The pedal 40 is then depressed to move the clutch 30 clear of the clutch 22 and simultaneously draw the pin 61 out of engagement with the corresponding aperture 62 in the flange 63 of the turret. The turret is then free to be rotated to bring the next pan 1 over the glue pan 4. Before the movement of the turret is complete the pedal 40 is released thereby allowing the end of the pin 61 to rest against the underside of the flange 63 ready to slip into the next aperture 62 therein. The parts are so proportioned that when the end of the pin 61 is in contact with the underside of the flange 63 the clutch 30 is held entirely clear of the clutch 22, so that the latter will not interfere with the movement of the turret.

As the pin 61 slips into the aperture 62, the clutch 30 moves into engagement with the adjacent clutch 22 and accurately alines itself therewith, the pin 61 moving relatively to the base 3 if necessary and thereby compressing one or other of the springs 72 (Fig. 18), by which the pin is yieldingly supported laterally.

In this movement of the turret the lower end of the yoke 23, which moves the gear 20 in and out of engagement with the gear 19 and the clutch 22, passes out of contact with the cam 28, so that the spring 27 is free to press the yoke 23 and thereby the gear 20 into mesh with the gear 19 and also into frictional engagement with the clutch 22. As the gear 19 rotates continuously irrespective of the movements of the turret or of the pedals 40 or 41, the gear 20 is immediately set in rotation to drive its shaft 21 through the clutch 22. The hat block 106 and the hat thereon is, therefore, rotated under the first of the series of hot-air pipes 6.

The hat now substantially completely dry which is on the block 106, which has moved into position over the glue pan 4, is then removed and a fresh unglued hat inserted in its place. This block is stationary at this time owing to the action of the cam 28 on the yoke 23, which controls the position of the gear 20.

When the arm 75 was released by the cam 83 at the end of the period of high speed rotation of the previous hat the arm 85 was left with its end in contact with the extension 84 of the cam, and if it remained in that position it would prevent all further rotation of the cam. However, when the arm 75 is depressed by the pedal 41 for spinning the second hat, the cross-piece 96 engages and depresses the head of the bolt 95, thereby raising the opposite end of the arm clear of the extension 84. Immediately the arm is shot forward by its spring 94, which draws the bolt 95 clear of the cross piece 96 and allows the arm to rest on the extension 84 and to fall behind it by gravity for engagement with the extension 84 when it again comes around.

The machine, therefore, operates continuously, a substantially dried hat being taken off every time a fresh unglued hat is placed thereon.

I am aware that numerous details of construction may be varied through a wide range without departing from the principles of this invention, and I therefore do not purpose limiting the patent granted otherwise than necessitated by the prior art.

I claim as my invention:

1. A machine of the kind described comprising in combination a rotatable turret, a series of hat supports carried by and symmetrically arranged around the turret, and means for rotating each of said supports, and means for simultaneously rotating one of said supports at a greater speed than the others.

2. A machine of the kind described comprising a hat support, means for rotating the hat support to remove excess size from a hat thereon, and means for stopping the rotation of the support after a predetermined number of revolutions.

3. A machine of the kind described comprising a hat support, means for moving the hat support as a whole around a closed path, means for rotating the hat support, and means for rotating the support more rapidly in one point in said path than at other points.

4. A machine of the kind described comprising a hat support having crown and brim portions, means for applying heat directly to said support and means for simultaneously rotating the support.

5. A machine of the kind described comprising a hat support, means for delivering air to dry a hat thereon, and means for simultaneously rotating the hat support.

6. A machine of the kind described comprising a hat support, means for heating the hat support, and means for delivering air downwardly onto the hat support.

7. A machine of the kind described comprising a hat support, means for heating the hat support from beneath, means for delivering heated air downwardly onto the hat support, and means for rotating the support while being so heated.

8. A machine of the kind described comprising a hat support, means for intermittently moving the support as a whole around a closed path including a series of stations, and means at one station for rotating the support at relatively high speed to remove excess size from a hat on the support.

9. A machine of the kind described comprising a hat support, means for intermittently moving the support as a whole along a continuous path including a plurality of stations, means at one of the stations for removing excess size from a hat on the support, and means at another station for drying the size remaining on the hat.

10. A machine of the kind described comprising a hat support, and means for rotating the support first at a high speed to remove excess size on a hat on the support and then at a low speed to aid in the drying of the remaining size on the hat.

11. A machine of the kind described comprising a hat support, means for rotating the support first at high speed to remove excess size on a hat on the support and then at low speed to aid in the drying of the remaining size on the hat, and means for projecting heated air on the hat while rotating at low speed.

12. A machine of the kind described comprising a turret, a symmetrically arranged series of shafts extending radially therefrom, hat supports rotated by said shafts, means for intermittently turning the turret through the angle between adjacent shafts, means for rotating the shafts simultaneously at the same speed, and further means adjacent one part of the turret for automatically disconnecting said shafts in turn from said means for rotating them as each shaft comes opposite said further means, and means for rotating such shaft after disconnection at a higher rate of speed than the other shafts.

13. A machine of the kind described comprising a turret, a symmetrically arranged series of shafts extending radially therefrom, hat supports rotated by said shafts, means for intermittently turning the turret through the angle between adjacent shafts, bevel gears slidably and rotatably mounted on the shafts, a clutch on each shaft, means for releasably holding said gears in connection with said clutches, a bevel wheel for rotating said gears simultaneously, and means for disengaging said gears in turn from its clutch and said bevel wheel as said gears move into a position adjacent said means, and means for subsequently rotating the corresponding shaft at a higher rate of speed than the adjacent shafts.

14. A machine of the kind described comprising a hat support, a driving shaft, a driven shaft adapted to rotate the hat support, a clutch between the shafts, means for bringing the clutch into operation, and means for releasing the clutch after a predetermined number of revolutions of the driven shaft.

15. A machine of the kind described comprising a hat support, means for heating the support to expel moisture from the inside of the hat and means for delivering a current of air onto the outside of the hat to carry away moisture from its exterior.

16. A machine of the kind described comprising a pan, means for moving the pan around a closed path, means for rotating a hat within the pan to remove excess size from the hat, and means for discharging the size so removed from the pan at one point in the path of the latter.

17. A machine of the kind described comprising a pan, means for rotating a hat within the pan to remove excess size from the hat, and cam operated means for discharging the size so removed from the pan.

18. A machine of the kind described comprising a pan, a hat rotatably mounted within the pan, means for intermittently moving the pan around a closed path including a series of stations, means for rotating the hat at one station at a higher rate of speed than at the other stations to remove excess size therefrom, and means for discharging the thin size collecting in the pan by gravity at the first station prior to rotation into a different receptacle than the heavier size collecting in the pan as a result of the high speed rotation at such station.

19. A machine of the kind described comprising a turret, a symmetrically arranged series of shafts extending radially therefrom, hat supports adapted to be rotated by said shafts, means for intermittently turning the turret through the angle between adjacent shafts, a driving shaft adapted to rotate about a fixed axis in alinement with one of said shafts, a clutch member on the driving shaft, corresponding clutch members on each of the series of shafts, and means for moving the clutch on the driving shaft into engagement with the clutch on each of the series of shafts as the latter in turn move into alinement with the driving shaft.

20. A machine of the kind described comprising in combination, a rotatable hat support, a hat block adapted to rest thereon, and positively interlocking members carried by said support and block releasably connecting the latter and positively preventing accidental removal of the block.

21. A machine of the kind described comprising a rotatable hat support, a rod passing axially through said support and longitudinally adjustable thereto, a hat block adapted to rest on said support, a clamping member secured to said rod adapted to engage releasably a portion of said hat block and positively prevent accidental removal of the block.

22. A machine of the kind described comprising a rotatable turret, a series of hat supports carried by and symmetrically arranged around the turret, a gas burner under each support, a circular liquid container secured to the turret, a non-rotatable inverted gas container projecting downwardly into the liquid in the first container, a gas connection from a source of supply to the second container, and a gas connection from said burners passing into the second container and projecting above the level of the liquid therein.

23. A machine of the kind described comprising a rotatable turret, a series of hat supports carried by and symmetrically arranged around the turret, a gas burner under each support, a fixed gas supply member concentric with the turret, a gas receiving member concentric with the turret connected to said burners, and a liquid seal between said members.

24. A machine of the kind described comprising a rotatable turret, a series of hat supports carried by and symmetrically arranged around the turret, a gas burner under each support, a channeled ring rotating with the turret, a narrower inverted channeled non-rotatable ring extending downward into the first ring, a gas supply pipe connected to the second ring, and a gas receiving pipe extending into the second ring, and liquid in the first ring adapted to prevent gas flowing around the lower margins of the second ring.

25. A machine of the kind described comprising a hat support, means for rotating the support including a driving shaft, a driven shaft and a clutch therebetween, a lever for operating the clutch, means for normally holding the lever with the clutch in disengaged position, means for releasably holding the lever in engaged position in opposition to the first means, and cam operated means rotated by the driven shaft for releasing the lever from engagement with the second means and thereby stopping the rotation of the support after a given number of revolutions.

26. A machine of the kind described comprising a hat support, means for rotating the support including a driving shaft, a driven shaft and a clutch therebetween, a lever for operating the clutch, means for normally holding the lever with the clutch in disengaged position, a spring pressed latch for releasably holding the lever in closed position in opposition to said means, an arm pivoted to said lever adapted to be engaged by a cam rotated by the driven shaft and thereby pressed rearwardly to move the latch out of engagement with the lever to stop the rotation of the support after a given number of revolutions.

27. A machine of the kind described comprising a turret, a symmetrically arranged series of shafts extending radially therefrom, hat supports adapted to be rotated by said shafts, means for intermittently turning the turret through the angle between adjacent shafts, a driving shaft adapted to rotate about a fixed axis in alinement with one of said shafts, a clutch member on the driving shaft, corresponding clutch members on each of the series of shafts, means for moving the clutch on the driving shaft into engagement with the clutch on each of the series of shafts as the latter in turn move into alinement with the driving shaft, and yieldingly mounted means for holding the turret in approximate position between each turning movement thereof whereby the turret may adjust its position to bring the clutch members into accurate alinement.

28. A machine of the kind described comprising a hat support, means for applying heat externally to a hat upon the support to dry the hat and means for heating the support to prevent condensation upon the support of water vapor formed by the action of said heating means on the exterior of the wet hat.

In testimony whereof I have hereunto subscribed my name in the presence of two subscribing witnesses:

BURTON R. LA SELLE.

Witnesses:
EARL M. HARDINE,
CHAS. W. HILLS, Jr.